United States Patent [19]

Breimer

[11] 3,876,826

[45] Apr. 8, 1975

[54] DATA TRANSMISSION SYSTEM

[75] Inventor: Hendrik Breimer, Emmasingel, Eindhoven, Netherlands

[73] Assignee: U.S. Philips Corporation, New York, N.Y.

[22] Filed: May 10, 1972

[21] Appl. No.: 252,334

[30] Foreign Application Priority Data

May 19, 1971 Netherlands ....................... 7106854

[52] U.S. Cl. ............................ 178/6.8; 178/DIG. 15

[51] Int. Cl. ............................................. H04n 5/24

[58] Field of Search ............... 179/15 AP; 325/38 B; 178/DIG. 15, DIG. 23, 5.6, 6, 6.8; 340/347 AD

[56] References Cited

UNITED STATES PATENTS

| | | | |
|---|---|---|---|
| 3,215,774 | 11/1965 | Ikegami | 178/DIG. 15 |
| 3,276,012 | 9/1966 | Secretan | 340/347 AD |
| 3,296,612 | 1/1967 | Tomozawa | 325/38 B |
| 3,480,948 | 11/1969 | Lord | 340/347 AD |

*Primary Examiner*—Howard W. Britton
*Assistant Examiner*—Jin F. Ng
*Attorney, Agent, or Firm*—Frank R. Trifari; Simon L. Cohen

[57] ABSTRACT

A data transmission system for time division multiplex remote control between adjusting points in an operating station and processing points in a plurality of television cameras, in which system only variations and no instantaneous values are transmitted. The cameras are each provided with a store in which the received information regarding variation at an adjusting point is added, through a superimposition stage, to the old information. In contrast with a transmission of the instantaneous values from the adjusting points a change-over during operation from one to the other differently adjusted camera is possible without any detrimental consequences.

5 Claims, 1 Drawing Figure

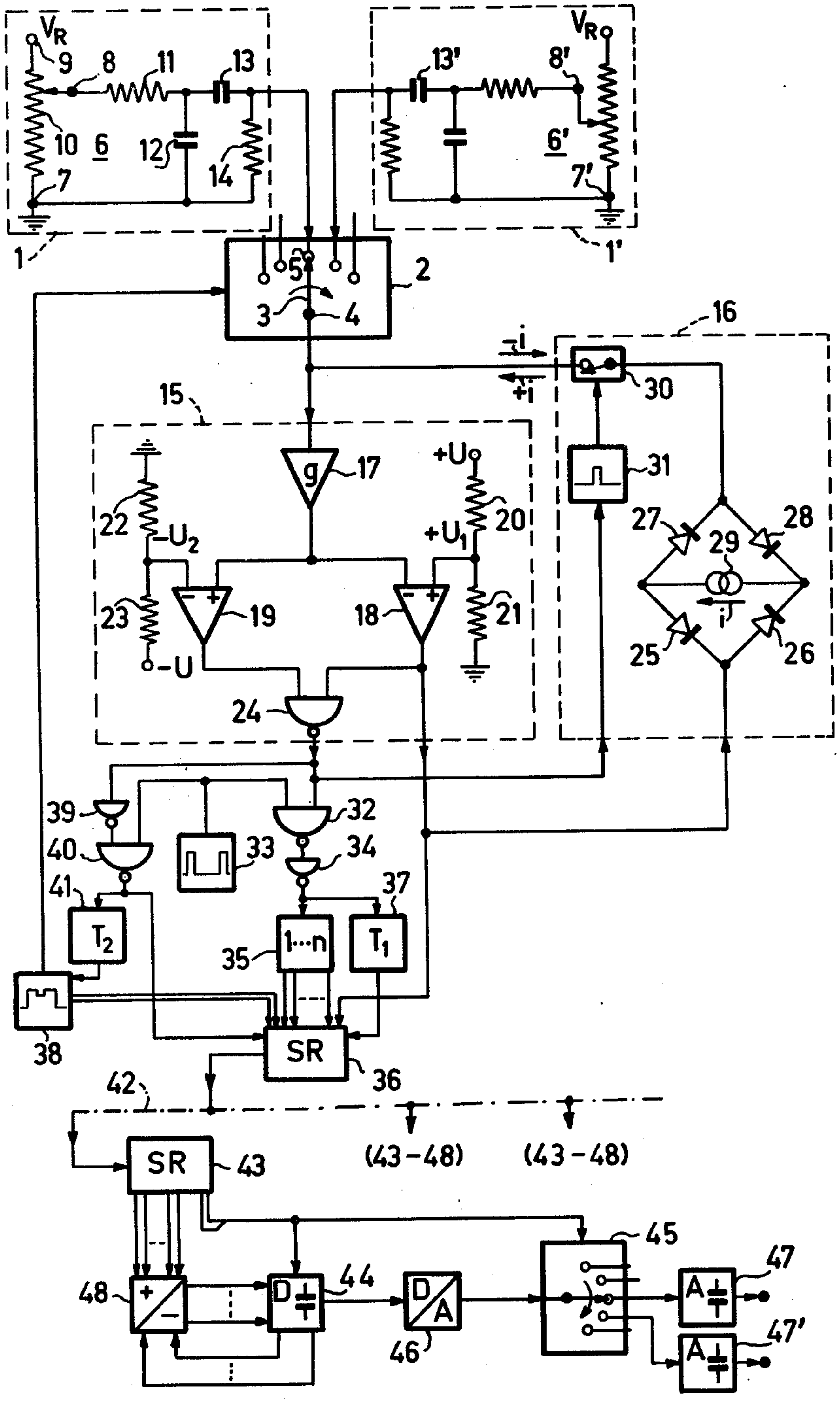

DATA TRANSMISSION SYSTEM

The invention relates to a data transmission system including a data transmitter and a receiver remote therefrom which are coupled through a transmission path. The data transmitter includes a plurality of adjusting points and the receiver including corresponding processing points. The adjusting and processing points can be coupled together in a cycle through a time division multiplex circuit. In the transmission system exclusively the magnitude of a variation at an adjusting point which occurred during the previous cycle period is transmitted. Furthermore, the invention relates to a data transmitter and receiver suitable for this purpose.

Such a system is described in Netherlands Pat. No. 87.562. This patent specification describes a system for remote measurement in which only the adjusting or measuring point variation relative to a previous selection in the cycle is transmitted. To this end a terminal conveying a direct voltage is connected in each measuring point through a capacitor to one of the selection contacts in the time division multiplex circuit whose single output is connected to a voltage detector and a circuit supplying a current. When the voltage detector detects a voltage on the selection contact, its value is passed on to the transmission path and subsequently the circuit supplying the current rapidly gives the selection contact the ground potential. When during the next cycle period the direct voltage on the terminal varies, the voltage on the selection contact likewise varies and the variation is detected and transmitted again at the next selection. When there is no variation, there is no transmission. The result is that the transmission path is not needlessly loaded by the transmission of measuring data which have not changed.

An object of the invention is to provide a different use of the described principle of signal variation transmission only while using a refined embodiment, so that a great advantage is obtained relative to methods commonly used by those skilled in the art.

The system according to the invention is characterized in that the data transmission system employing digital signal transmission includes an operating station as a data transmitter and a plurality of receivers formed as television cameras. The cameras are alternately connectable to the operating station. Each camera is provided with a shift register, a digital store alternately connected to the processing points and a superimposition stage inputs of which are connected to the store and to the shift register coupled to the transmission path. In the superimposition stage a superimposition is effected of the data from the store and from the shift register. This superimposed data is supplied by the superimposition stage for storage in the store.

By including stores in the plurality of cameras operated by the single operating station and in the transmission of adjusting point variations only and not of instantaneous values the great advantage of a simple change-over from one to the other camera is possible. A change-over between correctly adjusted cameras ready for operation which are adjusted in a mutually different manner does not give rise to adjustment difficulties, as desired, no results, which would have resulted from the transmission of the instantaneous values of the adjusting points.

The invention will be described in detail with reference to the accompanying FIGURE as an example of a data transmission system.

In the FIGURE, 1 denotes an adjusting point which is connected to an input of a switching circuit 2. The switching circuit 2 which is constituted, for example, with transistors is provided with a plurality of inputs to each of which an adjusting point can be connected as is denoted for a second adjusting point by 1'. The switching circuit 2 is active as a time division multiplex circuit and is shown with a selection switch 3 switching in accordance with a cycle and its master contact 4 is connected to a selection contact 5 of a plurality of selection contacts shown.

The adjusting point 1 is constituted with a variable direct voltage source 6 which is provided with a terminal 7 connected to ground as a reference potential and with a terminal 8 conveying a variable voltage. The voltage source 6 includes a potentiometer 10 provided between the terminal 7 connected to ground and a terminal 9 conveying a reference voltage $V_R$. A tap of said potentiometer is connected to terminal 8. Terminal 8 is connected to ground through a resistor 11 and a capacitor 12 in series. The junction of resistor 11 and capacitor 12 which together act as a lowpass filter (11, 12) is directly connected, through a capacitor 13, to the selection contact 5 and is connected in series with a resistor 14 to ground.

Although in the adjusting point 1 the components are shown near one another, terminal 8 may be located at some distance from the lowpass filter (11, 12) which is then provided so as to prevent parasitic phenomena induced in the connection to terminal 8 from reaching capacitor 13. Capacitor 13 will be found to be active as a storage capacitor and has, for example, a large capacitance of 2.2 μF. The leakage resistor 14 of 2.2 MOhm prevents drift phenomena caused by parasitic couplings from influencing the voltage on the selection contact 5.

Master contact 4 in the switching circuit 2 is connected to both a voltage detector 15 and to a current source 16. Current source 16 may supply currents to the contact 4 which currents may flow in both directions denoted by $+i$ and $-i$.

The contact 4 is connected in the voltage detector 15 to the input of a buffer amplifier 17 which does not take up input current and which has an amplification factor of $g$. The output of buffer amplifier 17 is connected to inputs of differential amplifiers 18 and 19. Differential amplifiers 18 and 19 have an inverting (−) and a non-inverting input (+), respectively, which are connected to the buffer amplifier 17. A bias $+U_1$ is applied to the non-inverting input of amplifier 18. The bias $+U_1$ is obtained from a potential divider including two resistors 20 and 21 which are arranged in series between a terminal conveying a voltage of +U and ground. The inverting input of amplifier 19 is connected to a bias $-U_2$. The bias $-U_2$ is provided by a potential divider including two resistors 22 and 23 which are arranged in series between ground and a terminal conveying a voltage of −U. The voltages $U_1$ and $U_2$ may be equally high. The outputs of the differential ampifiers 18 and 19 are connected to inputs of a NAND-gate 24. Voltage detector 15 has two outputs, one being the output of the gate 24 and the other being the output of the differential amplifier 18.

The two outputs of voltage detector 15 are connected to two inputs of current source 16. The output of amplifier 18 is connected to a junction of two diodes 25 and 26 which form part of a bridge circuit of four diodes 25, 26, 27 and 28. A current source 29 which can supply a current *i* is arranged between the junction of the anodes of diodes 25 and 27 and the junction of the cathodes of diodes 26 and 28. The junction of diode 27 and 28 is connected to contact 4 through an on-off switch 30 shown diagrammatically. Switch 30 which is formed, for example, with transistors is switched on and switched off under the control of a control unit shown as a pulse generator 31 to which for the purpose of its control the voltage occurring at the output of the gate 24 is applied.

For the differential amplifier 18 incorporated in voltage detector 15 there applies that in case of a voltage at the inverting input which is more positive than $+U_1$ the output conveys the voltage $-U$ and in case of a positive voltage smaller than $+U_1$ or a negative voltage the output conveys the voltage $+U$. For amplifier 19 there applies that for a voltage at the non-inverting input which is more negative than $-U_2$ the output conveys a voltage $-U$ and for a voltage less negative or positive the output conveys the voltage $+U$. It is found that for a voltage provided by buffer amplifier 17 having a value of between $-U_2$ and $+U_1$ the outputs of the two differential amplifiers 18 and 19 convey the voltage $+U$. This voltage $+U$ corresponds for gate 25 with a logical 1 so that the output of the NAND-gate 24 then conveys the logical 0. However, when buffer amplifier 17 provides a voltage which is more positive than $+U_1$ or is more negative than $-U_2$, amplifier 18 or 19 provides the voltage $-U$. As a result a logical 0 corresponding thereto is applied to one of the inputs of gate 24 so that the output conveys the logical 1. The result is that when gate 24 supplies the logical 1, voltage detector 15 provides the information of the voltage at contact 4 being more positive than $+ 1/g\ U_1$ or more negative than $- 1/g\ U_2$. To be able to distinguish these two possibilities the output voltage of amplifier 18 is used for which there applies that this is $-U$ if the voltage at contact 4 is more positive than $+ 1/g\ U_1$ and is $+U$ for a voltage which is more negative than $-1/g\ U_2$. Instead of amplifier 18, amplifier 19 might alternatively be selected.

The operation of the combined voltage detector current source circuit (15, 16) is as follows. Let it be assumed that for a previous cycle in the switching circuit 2 the position of potentiometer 10 at adjusting point 1 is the same as that shown at adjusting point 1' and that the ground potential occurs at contact 5. This means that capacitor 13 at adjusting point 1 is charged to the voltage which is now present between terminals 8' and 7'. Subsequently potentiometer 10 is put in the position as shown at the adjusting point 1. Before the selection switch 3 reaches contact 5, the junction of capacitor 13 and leakage resistor 14 conveys a positive voltage which corresponds to the potentiometer adjustment. When switch 3 reaches contact 5, the voltage detector 15 is put into operation when the positive output voltage of amplifier 17 is more positive than $+U_1$. In this case gate 24 provides the logical 1 and pulse generator 31 provides pulses of short duration as long as this condition continues. These pulses switch on switch 30. Amplifier 18 then provides the negative voltage $-U$ for the current source bridge circuit (25–29). During the periods when switch 30 is switched on, current $-i$ starts to flow through diode 28, current source 29 and diode 25. The current $-i$ flowing with a pulse function from current source 16 causes the junction of capacitor 13 and resistor 14 to decrease in voltage, and capacitor, to be discharged in steps. When the voltage at contact 5 comes below the value $+ 1/g\ U_1$, the voltage detector 15 no longer detects any voltage and gate 24 provides the logical 0 so that pulse source 31 stops its operation and switch 30 maintains current source 16 switched off.

It is found that the voltage detector current source circuit (15, 16) provides a pulse having the logical 1 for the output of gate 24 during the period when current source 16 supplies the pulsatory current $-i$ or $+i$ to contact 5 so as to reduce the positive or negative voltage present thereon to values of between $+ 1/g\ U_1$ and $- 1/g\ U_2$. Current source 16 is active as a charge source which provides a measured quantity of charge in a pulsewise manner for contact 5 and thus for capacitor 13. The measured quantity of charge corresponds to a given variation in the voltage across capacitor 13 and this may be, for example, 20 mV. For a voltage $V_R$ which is equal to 5V and a displacement of potentiometer 10 between ground potential and the voltage $V_R$ it follows that current source 16 provides the maximum number of 250 current pulses. The biases $+U_1$ and $-U_2$ are chosen to be such that $1/g\ (U_1 + U_2)$ is larger than the voltage variation of 20 mV, given as an example, across capacitor 13.

The voltage detector current source circuit (15, 16) provides the variation at the adjusting point 1 relative to a measurement during the previous cycle as a pulse duration information which corresponds to the magnitude of the variation (gate 24) and as a positive or negative voltage information which corresponds to the sense, i.e., the direction of the variation (amplifier 18). To realize data transmission in a digital manner, the output of gate 24 is connected to an input of a NAND-gate 32. A further input of gate 32 is connected to a clock pulse source 33 while the output is connected through an inverter 34 to the input of a pulse counter 35. Counter 35 receives clock pulses through gate 32 from source 33 when gate 24 provides the logical 1, which is the case as long as voltage detector 15 detects a voltage on contact 5 and as long as current source 16 is active. In case of a pulse repetition frequency of the pulse generator 31 equal to the clock pulse frequency of source 33 it follows that each current pulse from current source 16 corresponds to a pulse count in counter 35. As is shown for generator 31 and source 33, the pulses do not occur simultaneously. For the given maximum number of 250 current pulses it follows for counter 35 that it might be able to count from 1 to a minimum of $n - 250$, When using a standard counter there applies that counter 35 can count up to $2^8 = 256$ and is provided with eight outputs. The eight outputs of counter 35 are connected to eight inputs of a shift register 36 (SR). Shift register 36 is of the parallel-in-series-out type and receives the data provided by counter 35 under the control of a delay circuit 37 connected to a control input and having its input connected to the inverter 34. The delay circuit 37 has a delay period $T_1$ which is equal to approximately half a clock pulse period so as to prevent register 36 from taking up information from counter 35 while it varies.

In addition to the 8 counting information inputs connected to counter 35, register 36 has an information input which is connected to amplifier 16 so that this input receives the direction information for the variation. Finally register 36 has information inputs which are connected to an address source 38. The address source 38 applies a code to register 36, which code corresponds to the instantaneous position of selection switch 3 in switching circuit 2 the control input of which is likewise connected to an output of address source 38.

When subsequently voltage detector 15 does not detect a voltage on contact 5, the logical 1 pulse at the output of gate 24 ends and this gate provides the locigal 0. Gate 32 is blocked thereby and the count by counter 35 stops. The logical 0 provided by gate 24 occurs through an inverter 39 as a logical 1 at an input of a NAND-gate 40. A further input of gate 40 is connected to clock pulse source 33 and the result is that gate 40 passes a clock pulse to a control input of register 36 connected to the output and through a delay circuit 41 to the address source 38. The clock pulse provided by gate 40 activates register 36 and the information stored therein is applied as a pulse train by register 36 to a transmission path 42.

The pulse train applied by the parallel-series shift register 36 to transmission path 42 thus includes a plurality of pulses which determine the address associated with the adjusting point 1, a plurality of pulses which indicate the magnitude of the variation of the voltage source 6 and a pluse which is present with a logical 0 or 1 so as to indicate the direction of the variation. When using, for example, 16 adjusting points 1, 1' etc., 4 inputs of register 36 may be used for addressing so that with the 8 + 1 inputs for the information regarding variation register 36 can generate a pulse train having 13 pulses. The delay circuit 41 has a delay period $T_2$ which is slightly longer than the duration of the 13 pulses so that the address source 38 applies a new address after this duration to the switching circuit 2 and register 36.

If no variation after measurement in the previous cycle has occurred at the adjusting point 1' associated with the new address, gate 24 in voltage detector 15 does not provide a pulse of the logical 1 and gate 32 remains blocked. The clock pulse source 33 applies through gate 40 and delay circuit 41 a clock pulse to the address source 38 so as to enable this source to provide a following address. The read clock pulse provided through gate 40 to parallel-series shift register 36 does not have any further consequences because the shift register 36 can only become active after a pulse has occurred at the control input connected to the delay circuit 37, which is prevented by the blocked state of gate 32.

Transmission path 42 couples the data transmitter (1 – 41) to one of a plurality of receivers to be further described. The transmission path 42 may be formed as separate cable, but it may alternatively be a normal telephone connection. In case of transmission through a telephone connection the pulse train provided by parallel-series shift register 36 may be built up, for example, from pulses having a repetition frequency of 2,400 Hz, while clock pulse source 33 and pulse generator 31 may have a frequency of, for example, 24 kHz. Transmission path 42 is only loaded when a variation of the adjusting point in the data transmitter (1 – 41) has taken place so that there is no unnecessary load of the transmission path 42.

The transmission path 42 is connected in the receivers to a shift register 43. Shift register 43 is of the series-in-parallel-out type. When a pulse train is received through the transmission path 42, the series-parallel shift register 43 takes up this train. Outputs of register 43 which convey the address pulse information are coupled to an address input of a store 44 and a switching circuit 45. The switching circuit 45 is identical to the time division multiplex circuit 2 in the data transmitter (1 – 41). Store 44 is formed as an addressable digital store (D) and an output thereof is connected through a digitial-to-analog converter 46 (D/A) to the single input of switching circuit 45. Outputs of switching circuit 45 are connected to processing points 47, 47' etc. shown as analog stores (A) which correspond to the adjusting points 1, 1' etc.

When information is not provided through the transmission path 42 for the relevant receiver, for example, the processing points 47, 47' may be alternately connected in a cycle to digital store 44 through switching circuit 45 and digital-to-analog converter 46 so that information possibly lost at the processing points 47, 47' is implemented again.

When shift register 43 does receive relevant information through transmission path 42, an address comparison is effected in store 44. When the address provided by register 43 simultaneously occurs with the store address, store 44 is stopped. The information stored in store 44 is applied to inputs of a superimposition stage 48. Other inputs of stage 48 are connected to outputs of shift register 43 one output of which conveys the information of the direction and the other output of which conveys the information of the magnitude of the variation. Superimposition stage 48 acts as an adder (+) or a subtractor (−) dependent on the information about the direction of variation. The old store information associated with the added or subtracted information becomes available at the outputs of the superimposition stage 48 which outputs are connected to inputs of store 44 and this information becomes available for storage in store 44 and thereby for application to the processing point 47. In the given embodiment in which the current source 16 in data transmitter (1 – 41) supplies the current $-i$ an addition in the superimposition stage 48 of the relevant receiver (43 – 48) is effected.

The data transmission system is preferably suitable for television for the remote control from an operating station (1 – 41) of one or more television cameras (43 – 48). The remote control may be required for the adjustment of the diaphragm, focus or signal amplification and for controlling the linearity correction currents required for deflection. In color television cameras employing a plurality of camera tubes the remote control may be used for adjusting correction currents for correct registration of scanning rasters occurring in the camera tubes.

For making a choice in the operating station (1 – 41) which is the television cameras (43 – 48) is operated by remote control, shift register 36 may be provided with a selection switch so that the described pulse train applied to transmission path 42 is preceded by several pulses which determine the camera address. Adapted thereto, the shift registers 43 in the cameras (43 – 48) are provided with a reception address and upon reception of the own address the relevant shift register 43 is activated in the manner described.

It appears that in the transmission system only variations occurring at the adjusting points 1, 1' are transmitted to one of the cameras (43 – 48) and not, as is common practice, the instantaneous values at the adjusting points 1, 1'. The advantage thereof is evident as follows: the various cameras (43 – 48) may be ready for operation and may be correctly adjusted. This adjustment is stored in the digital stores 44. considered in absolute values the adjustments of the cameras (43 – 48) may be entirely different and may be adapted to the scenes to be picked up. Upon a change-over from one of the cameras (43 – 48) to another, operating station (1 – 41) may act on the other camera but this is effected only when a variation is introduced at the adjusting points 1, 1' so as to modify the adjustment of the relevant camera. Since instead of the instantaneous values only variations occurring at the adjusting points 1, 1' are transmitted, the result is that the changeover between the cameras (43 – 48) can be effected in a simple manner.

In case of correct adjustment of the cameras (43 – 48) no modification at all at the adjusting points 1, 1' needs to be effected in the operation station (1 – 41) when a change-over is effected between the cameras (43 – 48).

Although only variations and not instantaneous values are transmitted in the transmission system, calibration can still take place. In fact, when it is known in the camera (43 – 48) in one way or another, which absolute value is present at a given instant at the adjusting point 1 in data transmitter (1 – 41), the camera operator himself may write the same value into store 44. Variations transmitted through transmission path 42 relative to this calibration value are followed in the camera (43 – 48) as described. For such a calibration a clamping circuit at the adjusting points 1, 1' may be used which is active once during a given period and which impresses one given voltage on the terminals 8, 8'. After the clamping circuit is activated the adjusting points 1, 1' do not provide any variations after some time and it can be assumed for camera (43 – 48) that all adjusting points 1, 1' are stabilized on said given voltage. The operator himself may then write this given voltage into all store locations in store 44. After the clamping circuit has become inactive the variations at the adjusting points 1, 1' are transmitted so as to achieve the adjusted value.

A calibration of a single adjusting and processing point 1 and 47 is also possible by transmitting a calibration information with the address so that in the camera (43 – 48) it is known that a given instantaneous value is present at adjustable point 1 which value can then be written into the store 44 by the operator himself.

The simplest embodiment of the voltage detector-current source circuit (15, 16) would be an embodiment employing a single differential amplifier whose output is fed back through a resistor active as a current source to the inverting input which is connected to contact 4. The non-inverting input of the differential amplifier could be connected to ground. The differential amplifier is of the type which provides a voltage of zero or ground potential when the input voltage is zero and it provides a voltage +U when the input voltage is negative and –U when the input voltage is positive. The output of the amplifier is connected to an input of a gate another input of which is connected to a clock pulse source which gate passes clock pulses when the amplifier provides the voltage +U or –U and is blocked when the voltage is zero. The number of clock pulses passed is a measure of the magnitude of the variation and the voltage +U or –U indicates the direction of the variation.

The current source 29 shown in the Figure is switched on and switched off through switch 30. In practice, switching on and switching off of the current source 29 is unwanted and to avoid switching it is possible to provide two diodes near the current source bridge circuit (25 – 29), which diodes are provided in the same manner as the diodes 27 and 28 and which are connected to ground through an additional on-off switch. When switch 30 is switched on, the additional switch must be switched off, and conversely. The result is that the current source 29 conveys a constant current $i$ while current source 16 can provide the currents $+i$ and $-i$ pulsewise.

Current source 16 is in principle active as a charge source which provides measured quantities of charge one after the other. An embodiment employing a capacitor which is charged from or is discharged to contact 4 is quite possible.

What is claimed is:

1. A data transmission system for adjusting at least two television cameras from a single camera control unit of the type including a data transmitter and a receiver remote therefrom which are coupled together through a transmission path, the data transmitter including a plurality of adjusting points and the receiver including corresponding processing points, which adjusting and processing points are selectively coupled together in a cycle through a time division multiplex circuit, in which transmission system exclusively the change in adjustment level at an adjusting point which occurred during the previous cycle period is transmitted, the improvement wherein the data transmission system employing digital signal transmission includes a single operating station as a data transmitter and at least two receivers formed as television cameras and being selectively connected to the operating station, the data transmitter comprising means for transmitting the addresses of corresponding adjusting points and processing points and the magnitude of the changes in adjustment level, each camera comprising a shift register, an analog store, an addressable digital store, a superimposition stage, means selectively connecting the digital store to the processing points corresponding to said addresses and to the superimposition stage means connecting inputs of the superimposition stage to the store and to the shift register coupled to the transmission path, said superimposition stage comprising means for superimposing the data from the store on the data from the shift register, said superimposed data being provided by the superimposition stage for storage in the digital store and means responsive to said transmitted addresses for transferring the stored information from the digital store to the corresponding analog store.

2. A data transmission system as claimed in claim 1, wherein a voltage detector is connected to the adjusting point and comprises at least one differential amplifier an input of which is connected to a bias and another input of which is connected to a master contact of a selection switch in the time division multiplex circuit in the data transmitter, the output of the amplifier being connected to the master contact through a current source and wherein the current source comprises means responsive to the output of the amplifier for providing a series of current pulses having the same pulse width and amplitude.

3. A data transmission system as claimed in claim 2, wherein the output of the differential amplifier in the voltage detector which is connected to the current source is furthermore connected, for the purpose of giving the information about the variation of direction, to an input of a shift register whose output is connected to the transmission path.

4. A data transmission system as claimed in claim 2, wherein the voltage detector comprises two differential amplifiers each having an inverting and a non-inverting input, in which two dissimilar inputs are connected to each other and to the master contact of the selection switch, while the remaining inputs are each connected to a different bias, a gate, the outputs of the two amplifiers being connected to inputs of said gate whose output consititues an output for the voltage detector which conveys said series of pulses corresponding to the conducting state of the current source, while the output of one of the differential amplifiers is connected through the current source to the master contact of the selection switch.

5. A data transmission system as claimed in claim 4, wherein the output, conveying the pulse duration information, of the voltage detector is connected to a control input of an on-off switch which is incorporated in the current source and which determines the pulse width of the current source.

* * * * *

UNITED STATES PATENT AND TRADEMARK OFFICE

CERTIFICATE OF CORRECTION

PATENT NO. : 3,876,826

DATED : April 8, 1975

INVENTOR(S) : HENDRIK BREIMER

It is certified that error appears in the above-identified patent and that said Letters Patent are hereby corrected as shown below:

IN THE SPECIFICATION

Col. 1, line 64, cancel "as";

line 65, cancel "desired, no results,";

Col. 3, line 39, "+ 1/g $U_1$" should read --$+ \frac{1}{g} U_1$--;

line 40, "- 1/g $U_2$" should read --$- \frac{1}{g} U_2$--;

line 43, "+ 1/g $U_1$" should read --$+ \frac{1}{g} U_1$--;

line 44, "- 1/g $U_2$" should read --$- \frac{1}{g} U_2$--;

Col. 4, line 5, "capacitor," should read --capacitor 13--;

line 7, "+ 1/g $U_1$" should read --$+ \frac{1}{g} U_1$--;

line 17, "+ 1/g $U_1$" should read --$+ \frac{1}{g} U_1$--;

line 18, "- 1/g $U_2$" should read --$- \frac{1}{g} U_2$--;

line 28, "1/g $(U_1 + U_2)$" should read --$\frac{1}{g} (U_1 + U_2)$--;

Col. 7, line 10, "considered" should be --Considered--;

Signed and Sealed this

*seventeenth* Day of *February 1976*

[SEAL]

*Attest:*

RUTH C. MASON
*Attesting Officer*

C. MARSHALL DANN
*Commissioner of Patents and Trademarks*